(12) United States Patent
Jones et al.

(10) Patent No.: US 8,007,616 B2
(45) Date of Patent: Aug. 30, 2011

(54) MICROPOROUS BREATHABLE BUILDING AND CONSTRUCTION MATERIALS COMPRISING COATED WOVEN AND/OR NONWOVEN FABRICS, AND METHOD

(75) Inventors: Gregory K. Jones, Lebanon, OH (US); David G. Bland, Mason, OH (US); Thomas G. Mushaben, Cincinnati, OH (US); Nicole A. Gerwe, Cincinnati, OH (US)

(73) Assignee: Clopay Plastic Products Company, Inc., Mason, OH (US)

( * ) Notice: Subject to any disclaimer, the term of this patent is extended or adjusted under 35 U.S.C. 154(b) by 746 days.

(21) Appl. No.: 11/698,324

(22) Filed: Jan. 26, 2007

(65) Prior Publication Data

US 2007/0178784 A1 Aug. 2, 2007

Related U.S. Application Data

(60) Provisional application No. 60/762,976, filed on Jan. 27, 2006.

(51) Int. Cl.
*B32B 38/00* (2006.01)
*B29C 53/00* (2006.01)
*B29C 55/00* (2006.01)

(52) U.S. Cl. ................ 156/229; 156/244.24; 156/244.27

(58) Field of Classification Search .................. 156/229, 156/244.11, 244.24, 244.27
See application file for complete search history.

(56) References Cited

U.S. PATENT DOCUMENTS 4,929,303 A 5/1990 Sheth
(Continued)

FOREIGN PATENT DOCUMENTS

WO 9805502 A1 2/1998
(Continued)

OTHER PUBLICATIONS

International Search Report and Written Opinion dated Jun. 13, 2007 for International application No. PCT/US2007/002155.

(Continued)

*Primary Examiner* — Michael A Tolin
(74) *Attorney, Agent, or Firm* — Wood, Herron & Evans, LLP

(57) ABSTRACT

Breathable materials comprise a fabric layer and a polymer film layer thereon, the polymer film layer comprising a polymer composition and a filler, wherein the breathable material has undergone a physical manipulation to render the polymer film layer microporous such that the WVTR of the breathable material is greater than about 50 $g/m^2 \cdot 24$ hr, and wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension. Methods of making a breathable material comprise forming a polymer film layer comprising a polymer composition and a filler; bonding the polymer film layer to a fabric layer to form a laminate; and applying a physical manipulation to the laminate to render the polymer film layer microporous such that the WVTR of the resulting breathable material is greater than about 50 g/m2·24 hr; wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

21 Claims, 11 Drawing Sheets

U.S. PATENT DOCUMENTS

| | | | | |
|---|---|---|---|---|
| 4,983,450 | A | * | 1/1991 | Yanagihara et al. .......... 442/394 |
| 6,811,643 | B2 | * | 11/2004 | McAmish et al. ............ 156/229 |
| 2004/0016502 | A1 | | 1/2004 | Jones |
| 2006/0281379 | A1 | * | 12/2006 | Haas et al. ...................... 442/36 |

FOREIGN PATENT DOCUMENTS

| | | | |
|---|---|---|---|
| WO | 9829480 | A1 | 7/1998 |
| WO | WO 03/095197 | A1 * | 11/2003 |
| WO | 2007089575 | | 1/2007 |

OTHER PUBLICATIONS

European Patent Office, Office Action received in corresponding EP Application Serial No. 07717052.0 issued on May 3, 2010, 2 pages.

Patrick Mirandah Co., letter from Malaysian Associate regarding substantive examination report and search report issued on May 31, 2010, 6 pages.

* cited by examiner

From Extruder →

To Winder →

From Extruder →     To Winder →

MICROPOROUS BREATHABLE BUILDING AND CONSTRUCTION MATERIALS COMPRISING COATED WOVEN AND/OR NONWOVEN FABRICS, AND METHOD

RELATED APPLICATION

This application claims priority under 35 U.S.C. §119 of U.S. Application Ser. No. 60/762,976 filed Jan. 27, 2006.

FIELD OF THE INVENTION

The present invention is directed to microporous breathable materials comprising a fabric layer, for example a woven tape fabric, coated with polymeric film. These materials are suitable for use, for example, as building and construction materials, such as housewrap materials, roofing underlayment, and flashing. The present invention is also directed to methods for making such breathable materials.

BACKGROUND OF THE INVENTION

The building and construction industry uses fabrics, polymer films, and other such web-like materials extensively to cushion, insulate, seal, and/or protect various components of a building as it is being constructed. Examples of these web-like materials include housewrap, lumber wrap, roof underlayment, flashing, etc. These materials should be tough and strong to withstand the rigors of the building process. These materials often need to be water repellant, to protect the interior of the building from moisture damage; however, it is also desirable that the materials are breathable in order to allow water vapor generated in the building (e.g. steam, expiration, evaporating water) to escape rather than retained inside the building and causing moisture damage and other associated problems. These building materials may also play a role in insulating the building. Finally, of course, it is desirable to have the materials available at a reasonable cost.

For instance, housewrap materials are used to protect a building from water and wind damage during construction, especially in cold climates. Housewrap materials are typically attached or secured to the outer surface of framing or sheathing in the walls of buildings. Housewrap materials must be permeable to water vapor to allow water vapor to escape from the wall to which the film is secured to prevent water damage or the like. On the other hand, the housewrap materials should be sufficiently impermeable to air and liquids to insulate the wall against wind and rain or other precipitation. Further, housewrap materials should have adequate tensile and physical properties such as break strength, elongation, tear strength, shrinkage and puncture strength to avoid damage during installation and to facilitate durability.

To provide housewrap materials and other breathable materials suitable for construction and similar heavy duty use with sufficient strength and toughness, it is often desirable to use strong and/or tough nonwoven and/or woven fabrics.

The Sheth U.S. Pat. No. 4,929,303 discloses composite breathable housewrap materials which comprise a breathable film formed of linear low density polyethylene and a nonwoven fabric formed of cross-laminated fibers. The breathable film is formed by cast extruding a precursor film onto a roller, stretching the precursor film to impart permeability, heating the nonwoven fabric, and pressing the heated fabric to the film to bond the fabric and the breathable film. Owing to these successive processing steps, the manufacture of the disclosed housewrap materials can be somewhat cumbersome and expensive.

Patent Application Publication US 2004/0016502 A1 discloses breathable materials which comprise a low-elongation fabric layer coated with a microporous coating comprising a crystalline polymer composition and a filler. This application also discloses methods for extrusion coating the low-elongation fabric with the microporous-formable polymer coating, then incrementally stretching the coated fabric in order to render the polymer coating microporous. This invention has the advantage of being manufactured in a single-pass process. However, the invention requires the capital expense of machinery for an incremental stretching station or stations, and the ongoing operating expenses associated with running such incremental stretching equipment.

Accordingly, a need exists for improved breathable materials, including those which may employ relatively strong or tough woven or nonwoven fabrics, and for methods for facilitating the manufacture of such materials.

SUMMARY OF THE INVENTION

It is therefore an object of the invention to provide novel breathable materials which overcome various disadvantages of the prior art and which are particularly suitable for use in applications requiring high strength, such as construction applications. It is an additional object to provide novel methods for making such breathable materials.

In one embodiment, the invention is directed to breathable materials comprising a fabric layer and a polymer film layer thereon, the polymer film layer comprising a polymer composition and a filler, wherein the breathable material has undergone a physical manipulation to render the polymer film layer microporous such that the WVTR of the breathable material is greater than about 50 g/m$^2$·24 hr, and wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

In yet another embodiment, the invention is directed to methods of making a breathable material. The methods comprise forming a polymer film layer comprising a polymer composition and a filler; bonding the polymer film layer to a fabric layer to form a laminate; and applying a physical manipulation to the laminate to render the polymer film layer microporous such that the WVTR of the resulting breathable material is greater than about 50 g/m$^2$·24 hr; wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

The breathable materials according to the invention are advantageous in that they exhibit a desirable combination of strength, breathability, and liquid impermeability, and may be easily manufactured by the methods of the invention. These and additional objects and advantages provided by the breathable materials, building and construction materials and methods of the invention will be more fully apparent in view of the following detailed description.

BRIEF DESCRIPTION OF THE DRAWINGS

The detailed description will be more fully understood in view of the drawings, in which.

DETAILED DESCRIPTION

Figure 1:
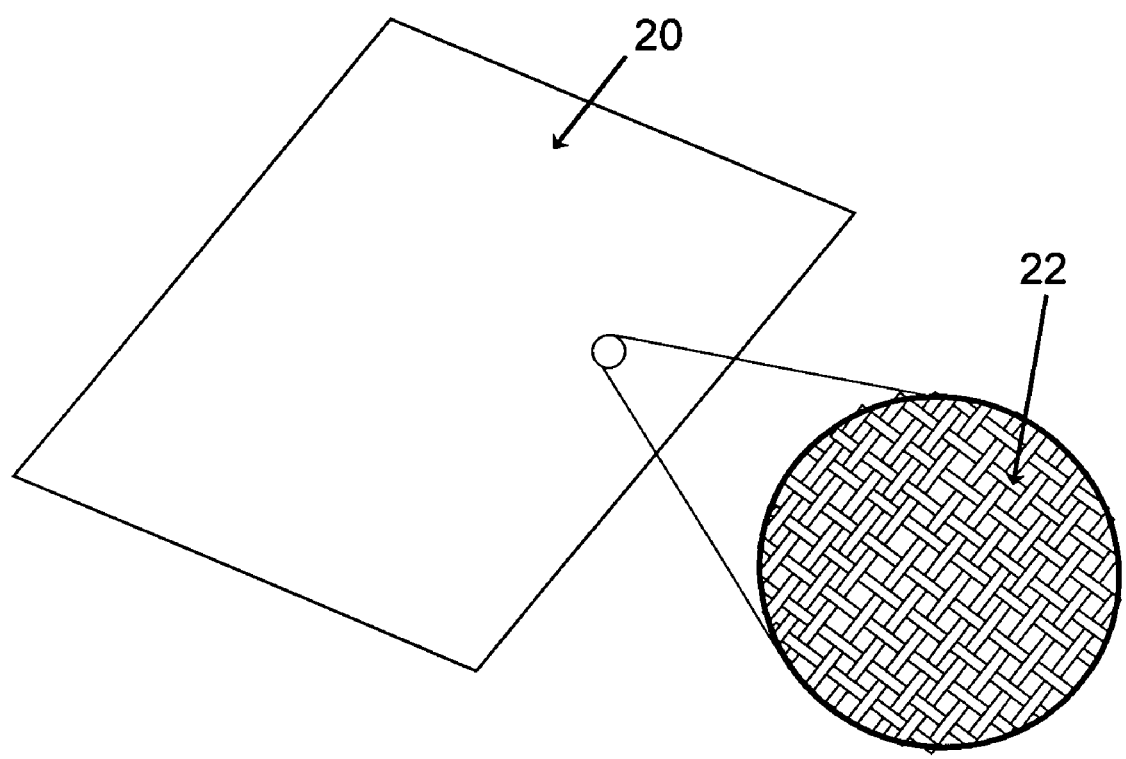
FIG. 1 shows a plan view of the woven tape fabric used in one embodiment of the invention, with a portion of the fabric magnified.

The present invention is directed to breathable materials for use in various applications. In one embodiment, the breathable materials are suitable for use as building and construction materials, including but not limited to housewrap materials, flashing, or roofing underlayment. However, one skilled in the art will recognize from the present description other specific applications and uses of the breathable materials which are within the scope of the invention.

For the purpose of this disclosure, the following terms are defined:

"Film" refers to material in a sheet-like form where the dimensions of the material in the x (length) and y (width) directions are substantially larger than the dimension in the z (thickness) direction. Films have a z-direction thickness in the range of about 1 μm to about 1 mm.

"Laminate" as a noun refers to a layered structure of sheet-like materials stacked and bonded so that the layers are substantially coextensive across the width of the narrowest sheet of material. The layers may comprise films, fabrics, or other materials in sheet form, or combinations thereof. For instance, a laminate may be a structure comprising a layer of film and a layer of fabric bonded together across their width such that the two layers remain bonded as a single sheet under normal use. A laminate may also be called a composite or a coated material. "Laminate" as a verb refers to the process by which such a layered structure is formed.

"Coextrusion" refers to a process of making multilayer polymer films. When a multilayer polymer film is made by a coextrusion process, each polymer or polymer blend comprising a layer of the film is melted by itself. The molten polymers may be layered inside the extrusion die, and the layers of molten polymer films are extruded from the die essentially simultaneously. In coextruded polymer films, the individual layers of the film are bonded together but remain essentially unmixed and distinct as layers within the film. This is contrasted with blended multicomponent films, where the polymer components are mixed to make an essentially homogeneous blend or heterogeneous mixture of polymers that are extruded in a single layer.

"Extrusion lamination" or "extrusion coating" refer to processes by which a film of molten polymer is extruded onto a solid substrate, in order to coat the substrate with the polymer film and to bond the substrate and film together.

"Material strength" or "tensile strength" refers to the tensile properties of a material, as measured by ASTM D-882 "Tensile Properties of Thin Plastic Sheeting". Unless noted otherwise, "material strength" or "tensile strength" refers specifically to tensile at break and % elongation at break.

"Breathable" refers to a material that allows the passage of water vapor or steam. For the present disclosure, a material is considered breathable if the material has a water vapor transmission rate (WVTR) of about 50 g/m$^2$·24 hr, as measured by ASTM E96A.

"Dimension" is the distance or length measurement of a known amount of material in a given direction. The dimension that is measured may be the width, length, thickness, bias, etc. When a material dimension is being measured, the entire piece of material may be measured (i.e. from edge to edge) or a designated portion or segment of the material may be measured, said designated portion or segmented being adequately marked or otherwise designated so the measurement can be repeated at the same location.

"Stretching" refers to a process by which one or more dimensions of a sheet-like material is permanently (i.e., non-recoverable) increased due to the application of a pulling, drawing or pressing force. Various methods of stretching a sheet-like material are known, including machine-direction orientation (MDO), incremental stretching, and tentering. When a sheet-like nonelastomeric material is stretched, the stretched material will increase in the dimension parallel to the stretching direction. For example, if a piece of nonelastomeric polymer film is cut into a rectangle that measures 2 inches by 6 inches, and the film is then stretched parallel to the "long" direction, the film will be longer than 6 inches after being stretched. For this disclosure, a material that increases more than about 2% in the dimension parallel to an applied stretching force is considered "stretched."

The breathable materials according to the invention comprise a fabric layer and a microporous coating thereon. The fabric should have a structure which avoids blocking a portion of the surface of the coating and, hence, does not seal or block the micropores on the surface of the coating. In one embodiment, the fabric generally has an open structure such as a mesh, scrim, or loosely woven fabric. For many building and construction materials, it is often desirable that the fabric is formed of a material or materials which are also relatively strong and tough. For example, in selected embodiments, the fabric may exhibit a tensile strength of at least about 20 lbs/in as measured according to ASTM D-882.

The fabric layer may be either woven or nonwoven fabric, or may be a combination of woven fabric and nonwoven fabric as desired. The fabric layer may comprise natural fibers, such as cotton, wool, silk, hemp, linen, etc., or the fabric may comprise fibers or strands of synthetic polymeric materials, such as polyolefins, polyamides, polyesters, polyacrylates, rayon, or other fiber-forming polymers. In one embodiment, the fabric is a nonwoven or woven fabric formed of one or more polyolefins, for example polyethylene, polypropylene, or combinations thereof. In another embodiment, the fabric comprises oriented polymer tapes loosely woven into a fabric. In a more specific embodiment, the fabric comprises oriented polyolefin tapes loosely woven into a fabric. Such materials are commercially available from Propex Fabrics, Inc., Austell, Ga., under the trade name PROPEX®. The PROPEX® fabrics and similar materials from other sources are available in a number of grades having varying combinations of physical properties which are suitable for use in the invention. For example, the woven tape fabric may comprise polypropylene or polyethylene tapes loosely woven into a fabric having a basis weight of from about 0.3 to about 4.0 oz/yd$^2$, more preferably from about 1.0 to about 2.5 oz/yd$^2$, most preferably from about 1.5 to about 2.0 oz/yd$^2$.

Other woven and/or nonwoven fabrics known in the art may be used as the fabric layer of the breathable materials of the invention. In one embodiment, the fabric layer is a nonwoven fabric comprising randomly-laid spunbonded fibers, for example a spunbonded polyolefin such as polyethylene, polypropylene, or combinations thereof. Suitable spunbonded nonwovens may have a basis weight equal to or greater than about 0.3 oz/yd$^2$. In a more specific embodiment, the fabric is a nonwoven fabric comprising spunbonded polypropylene having a basis weight equal to or greater than about 1 oz/yd$^2$, and more specifically, spunbonded polypropylene having a basis weight of equal to or greater than about 1.5 oz/yd$^2$. Spunbonded nonwoven fabrics suitable for use in the breathable materials may have fiber deniers of from about 2 to about 15, more specifically from about 10 to about 12, with spunbonded fabrics having fiber deniers at the higher end of this range being preferred for use in applications such as housewrap materials. Such spunbonded nonwovens are known in the art and are commercially available, for example, from Reemay, Inc. under the trade name TYPAR®.

In another embodiment, the fabric is a nonwoven fabric comprising a polyolefin cross-laminated open mesh. In a more specific embodiment, the fabric is a nonwoven fabric comprising polyethylene cross-laminated open mesh. Such fabrics are commercially available from Atlanta Nisseki CLAF, Inc. under the trade name CLAF®. The CLAF® fabrics are available in a number of grades having varying combinations of physical properties which are suitable for use in the invention. In one embodiment, the fabric is a nonwoven fabric comprising polyethylene cross-laminated open mesh having a basis weight of equal to or greater than about 0.4 oz/yd$^2$.

In another embodiment, the fabric is a nonwoven layer comprising a flash spun nonwoven material such as a flash spun high density polyethylene nonwoven material commercially available from DuPont under the trade name TYVEK®. The flash spun nonwoven materials are available in a range of basis weights and are suitable for use in the breathable materials of the invention. In certain embodiments, the flash spun nonwoven materials will have a basis weight in a range of from about 0.7 to about 4 oz/yd$^2$.

Woven tape fabrics are made by extruding a film of the desired polymeric fabric. The film is slit into strips, also called tapes, then the tapes are stretched to orient the polymeric materials. The orientation strengthens the polymer tapes in the stretching direction. These tapes are then woven into a fabric, much like fibers may be woven. The tapes may be woven in any common weave pattern. FIG. 1 illustrates a typical woven tape fabric 20. The fabric is formed of individual tapes 22 shown in the enlarged portion of the figure.

Figure 2:
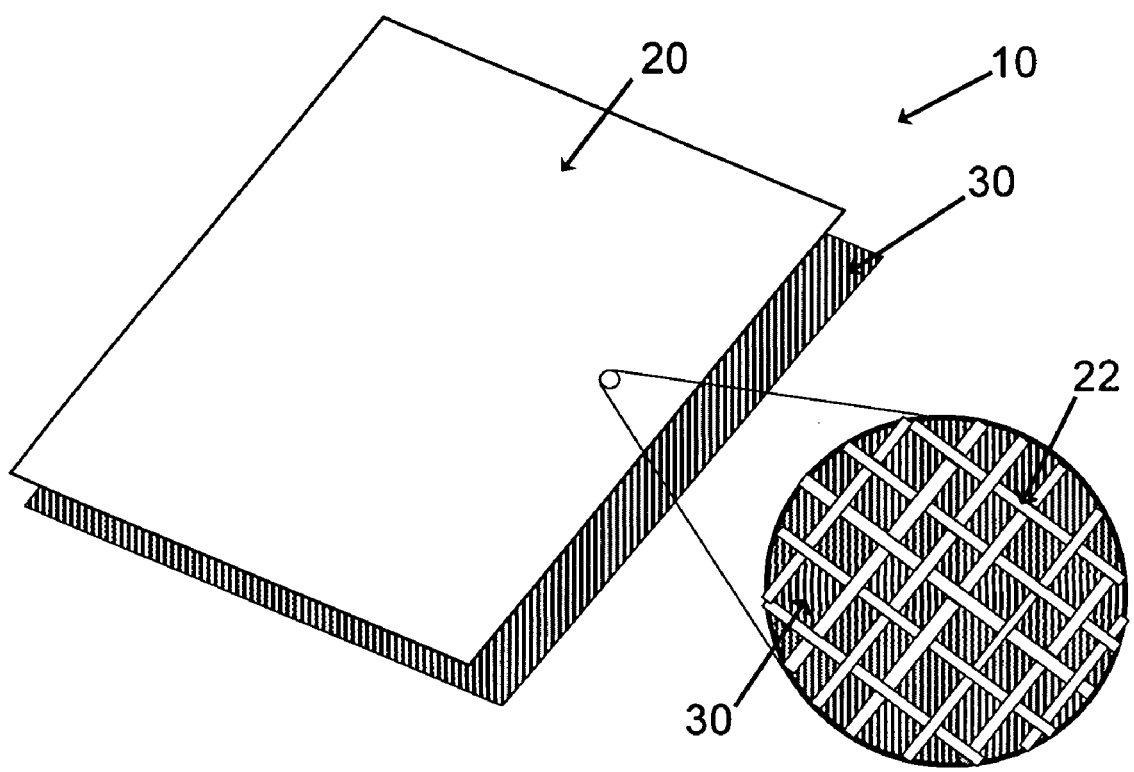
FIG. 2 shows a plan view of the coated woven tape substrate in one embodiment of the invention, with a portion of the coated substrate magnified.
Figure 3:
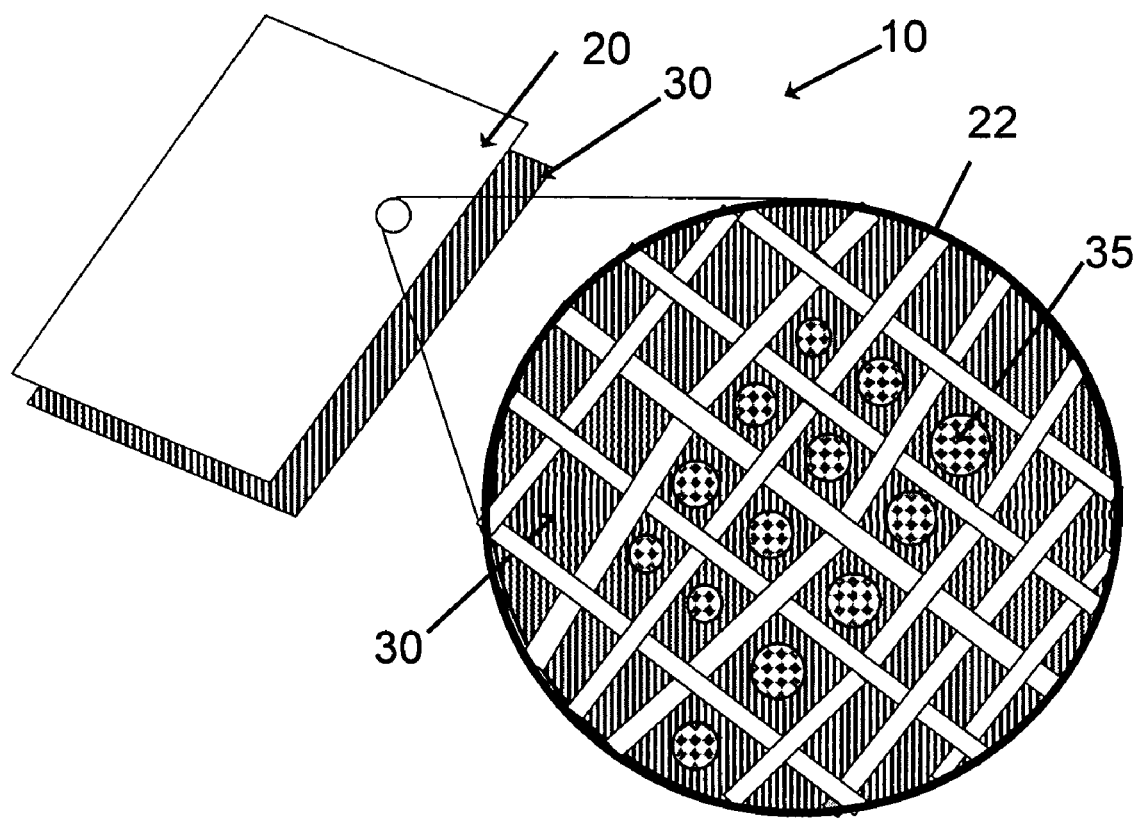
FIG. 3 shows a proposed model of micropore formation in accordance with an embodiment of the invention.

Woven tape fabrics are characterized in part by having little or no bond between the individual tapes 22 woven into the fabric. These tape fabrics also tend to have rather slippery surfaces, and the individual tapes 22 can move and slide relative to one another as the bulk fabric is moved. If the woven tape fabric 20 is coated with a polymer film 30, illustrated in FIG. 2, the film 30 will act to stabilize the woven tape fabric 20. However, if the film coating 30 is relatively thin, the individual woven tapes 22 can still slide or move somewhat relative to one another. Without wishing to be bound by theory, the inventors believe that if the woven tape fabric 20 is coated with a microporous-formable polymer coating 30 to form the inventive coated substrate 10, this movement of the individual tapes 22 may create localized stretching that is sufficient to create micropores in the coating between the tapes. FIG. 3 illustrates one concept of this localized stretching that the inventors believe may be taking place. The individual woven tapes, 22, have moved relative to one another. In doing so, the tapes have stretched the coating 30 in the zones 35 between the tapes.

This movement of the woven tapes 22 can be achieved by bending, twisting, pulling, or winding the coated substrate 10 under tension without actually stretching the bulk coated woven tape substrate or subjecting the coated substrate to a stretching force, such as incremental stretching.

The microporous coating 30 which is provided on the fabric 20 in the breathable substrates 10 of the invention comprises a polymer composition and a filler. Suitable polymers for the polymer composition of the coating include any thermoplastic polymers or blends of such polymers which may be extruded into a film. Such polymers include, but are not limited to, polyolefins, polyesters, polyamides, thermoplastic polyurethanes, polyvinyl chloride, polystyrene, and copolymers of these polymers. Preferred polymer compositions for the present invention include, but are not limited to, polyethylene and copolymers of polyethylene, polypropylene and copolymers of polypropylene, and polyethylene terephthalate and other copolymers polyethylene terephthalate, and other copolyesters. The polymer composition may also include polymer blends.

Suitable fillers for use in the respective film coatings include, but are not limited to, various organic and/or inorganic materials. In a specific embodiment, the filler may comprise one or more finely powdered inorganic materials such as metal oxides, metal hydroxides, metal carbonates and the like. Preferred fillers include, but are not limited to, calcium carbonate, barium sulfate, diatomaceous earth, talc, titanium dioxide, and mixtures thereof. The particle size of the filler may be selected in order to influence the micropore size in the coating and consequently the breathability of the material product. Typically, filler having an average particle size of from about 0.5 to about 5 microns is suitable, although fillers of smaller or larger size may also be employed. The filler may optionally include a surface coating to facilitate dispersion of the filler in the polymer composition, to increase the ability of the filler to repel water, and/or to increase incompatibility of the filler with the polymer composition and the formation of micropores at the vicinity of the filler. Suitable surface coatings include but are not limited to organic acids such as stearic or behenic acid, salts of organic acids such as calcium stearate, fatty acids and salts thereof, non-ionic surfactants, and similar such coatings.

The filler is included in the microporous coating in an amount suitable to provide the desired breathability. Generally, the filler may be employed in an amount of from about 25 to about 75 weight percent, based on the total weight of the microporous coating.

The coating 30 may be formed as one layer or as multiple layers on the fabric. In one embodiment, the coating comprises a single layer film which, as discussed in further detail below, may be formed on the fabric by an extrusion coating process. In a further embodiment, the coating comprises a multiple layer (two or more layer) film formed, for example, by coextrusion or sequential extrusion coating of two or more film layers where each layer comprises a different polymer film composition. In this embodiment, at least one of the film layers comprises a polymer composition and a filler, but it is not required, although it is permitted, that all of the film layers comprise a polymer composition and a filler. In a specific embodiment, the coating comprises a three layer laminate film formed by coextrusion lamination of a core layer comprising one polymer composition and a filler, between two outer layers formed of another polymer composition. For example, the core layer may comprise polypropylene and filler, while the outer layers are comprised of polyethylene and filler. In another specific embodiment, the core and outer layers may comprise the same polymer but different amounts of filler. For example, the core layer may comprise polypropylene and 35% filler, and the outer layers may comprise polypropylene and 50% filler.

Optionally, the breathable materials according to the invention may further comprise a second fabric layer, for example a woven or nonwoven fabric, wherein the microporous film layer is arranged between the first and the second fabric layers. Suitably, the second fabric layer may be of a similar form and composition as the first fabric layer, or the second fabric layer may be of a different form and/or composition. In one embodiment, the second fabric layer comprises a spun bonded nonwoven fabric, for example a spun bonded polypropylene.

The breathability of the materials according to the invention may be controlled as desired for the intended application of the materials. When employed as building and construction materials, such as housewrap, the inventive breathable materials suitably have a water vapor transmission rate of greater than about 50 g/m$^2 \cdot$24 hr, more specifically greater than about 150 g/m$^2 \cdot$24 hr, as measured according to ASTM E-96A. Typically, materials used for building and construction purposes do not require high water vapor transmission rates and often have a water vapor transmission rate of less than about 2000 g/m$^2 \cdot$24 hr. In other embodiments, the materials have a water vapor transmission rate less than about 1500, 1000, or 500 g/m$^2 \cdot$24 hr. It is understood however that materials having water vapor transmission rates higher than 2000 g/m$^2 \cdot$24 hr. are equally within the scope of the invention.

Another important property of building and construction materials is their resistance to impinging liquids such as water. Water resistance can be measured by testing the hydrostatic head pressure of the material by a method such as AATCC 127. For these materials used in the building and construction industries, a hydrostatic head pressure greater than 55 cm by the AATCC 127 test is usually acceptable.

Figure 4:
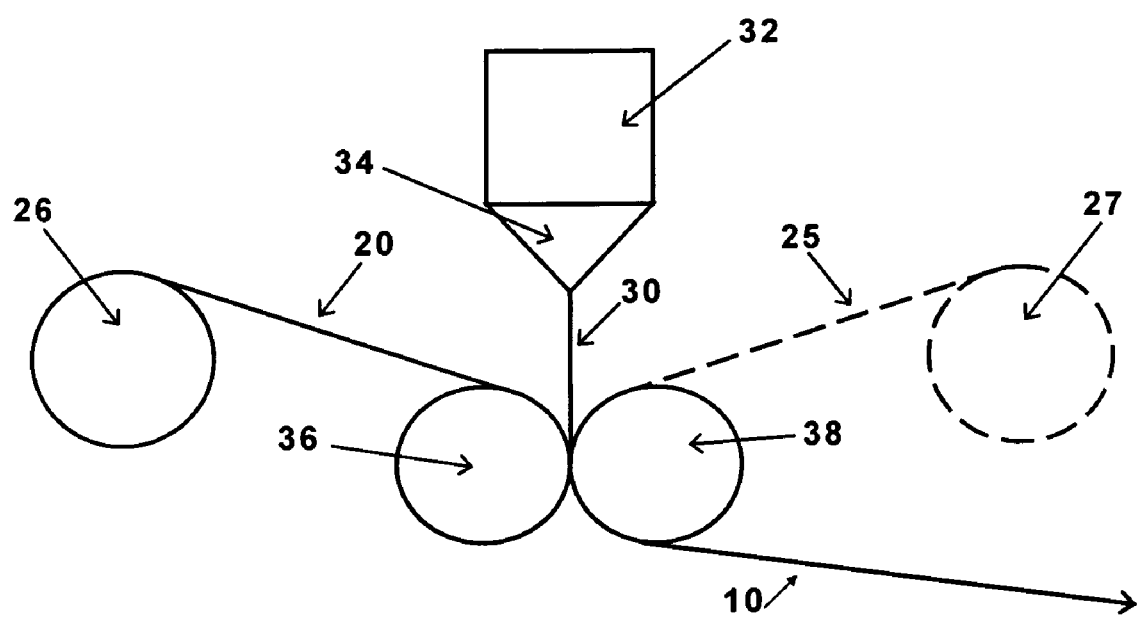
FIG. 4 shows a typical extrusion coating process.

In one embodiment of the invention, the breathable coated substrate 10 is manufactured by extrusion coating the fabric 20 with a composition comprising a polymer composition and a filler to form a coating 30 on the fabric, and manipulating the coated substrate 10 to render the coating microporous. For example, as illustrated in FIG. 4 using techniques well known in the art, a coating in the form of a film 30 may be extruded from an extruder 32 through a die 34 into a nip formed between rolls 36 and 38. The extrusion is conducted at or above the melt temperature of the polymer composition of the coating, typically on the order of about 400-500° F. Conventionally, the nip is formed between a metal roll 36 and a rubber roll 38. The fabric layer 20 may be provided, for example supplied from a roll 26, and the coating film 30 and the fabric 20 are passed through the nip of the rolls to adhere the coating to the fabric surface. Optionally, a second fabric layer 25 may be provided, for example supplied from a roll 27, and also passed through the nip of the rolls to adhere the coating to the second fabric surface. The resulting coated fabric 10 is then subjected to additional physical manipulation to render the coating microporous.

Figure 5:
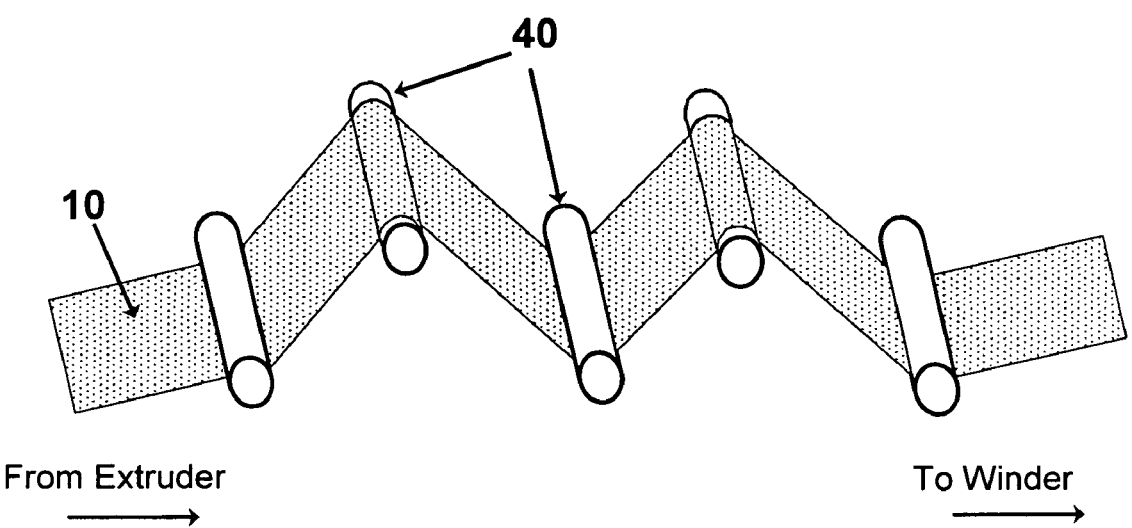
FIGS. 5-11 show various methods by which the inventive substrate may be rendered microporous according to the invention.
Figure 6:
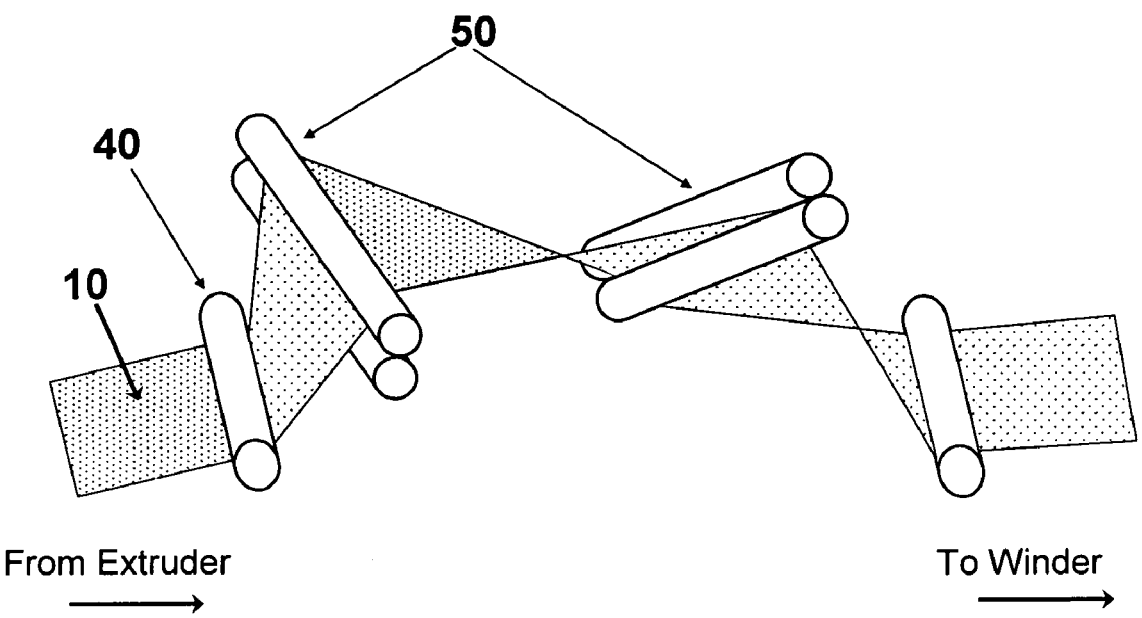
Figure 7:
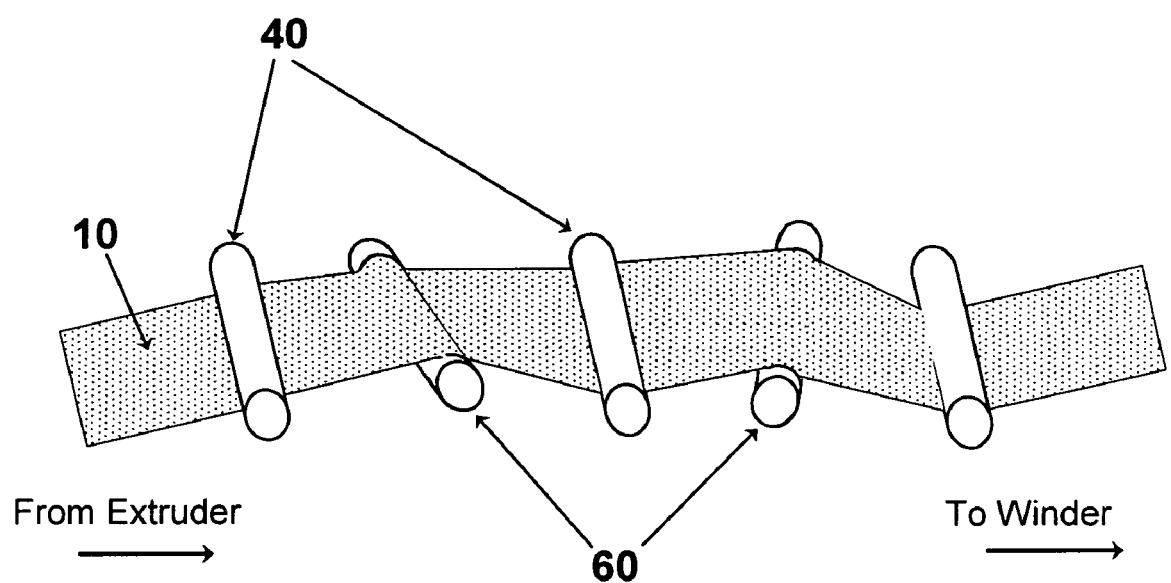
Figure 8:
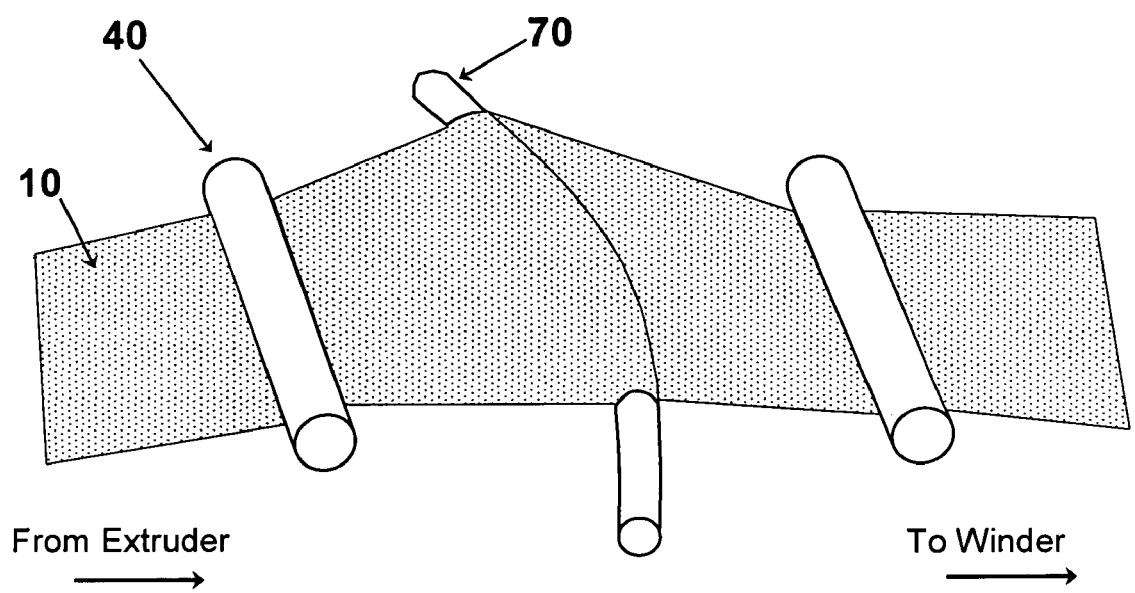
Figure 9:
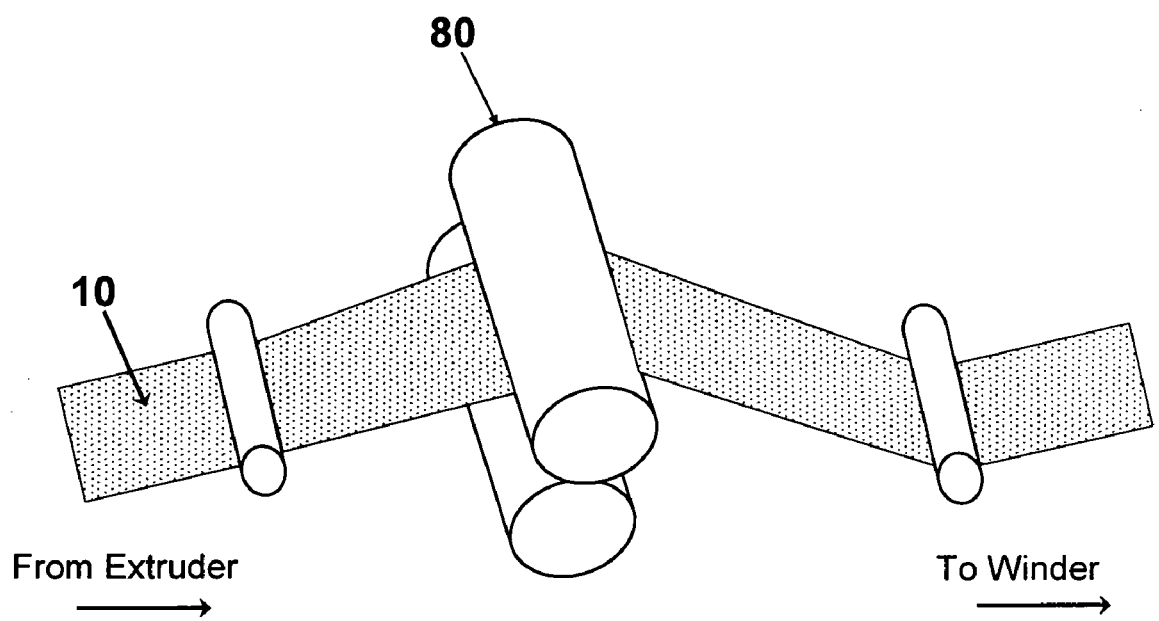
Figure 10:
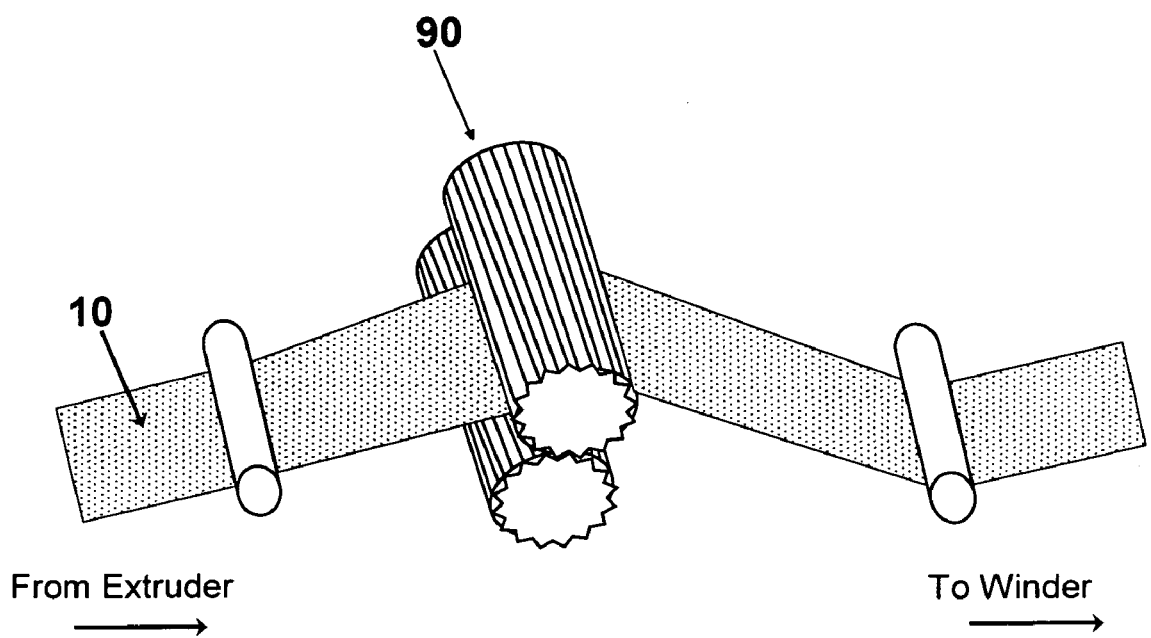
Figure 11:
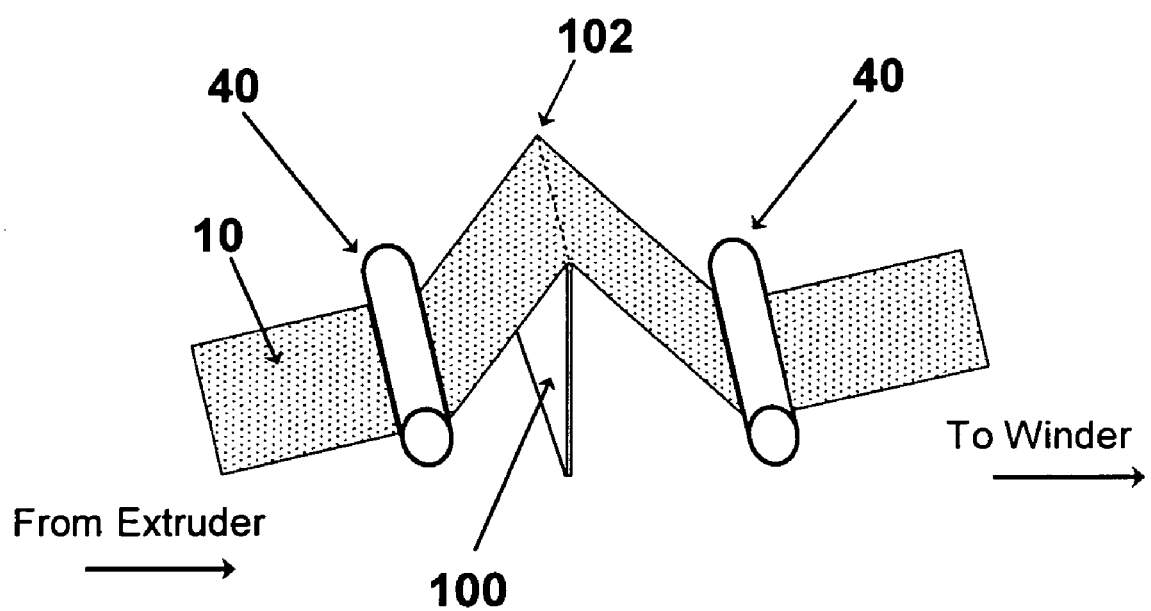

As noted above, the polymer composition, in combination with the filler, will be rendered microporous by a relatively small degree of moving, twisting, calendering, or otherwise physically treating the coated woven tape fabric. The inventors have discovered that, surprisingly, the small amount of tension applied to the coated substrate 10 during winding is enough to render the coated substrate breathable. Additional physical manipulation of the substrate 10, such as bending, twisting, or biasing, can be used to enhance the breathability of the coated substrate. In one embodiment, illustrated in FIG. 5, the coated substrate 10 is run over a series of idler rolls 40 to repeatedly bend the substrate. In an additional embodiment, illustrated in FIG. 6, the coated substrate 10 is subjected to a twisting action by running over idler rolls 40 and nips 50 set at angles to one another. In an additional embodiment, illustrated in FIG. 7, the coated substrate 10 may be run over idler rolls 40 and nips 50 slightly angled relative to the plane of the machine direction orientation, so that the substrate is subjected to a slight biasing force. In an additional embodiment, illustrated in FIG. 8, the coated substrate 10 may be run over a bowed roll or bar 70 to bend the substrate. In yet a further embodiment, illustrated in FIG. 9, the coated substrate 10 is calendered by calendering roll 80 to compress and then release the substrate. The calendaring roll may be smooth or embossed. In yet a further embodiment, illustrated in FIG. 10, the coated substrate 10 is run through grooved rollers 90 to bend, but not necessarily stretch, the substrate. In yet a further embodiment, illustrated in FIG. 11, the coated substrate 10 is guided over idler rolls 40 and then allowed to break over the edge 102 of a plate 102 with a small-diameter rounded edge, to bend or fold the substrate. Alternatively, a small-diameter turning bar may provide the edge 102 over which the substrate 10 breaks. In yet another embodiment, the coated substrate 10 may be subjected to a heat treatment such as annealing, in order to cause the substrate to move with the temperature diffential. In yet other embodiments, the substrate 10 may be subjected to MD and/or CD tension. It is not necessary, however, to stretch the coated woven substrate in order to render it breathable.

Accordingly, in one embodiment of the invention, the resulting material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

The following examples are intended to illustrate the present invention. These examples, however, do not limit the scope of the present invention.

EXAMPLE 1

This example demonstrates a breathable substrate according to the invention, which comprises a multilayer microporous coating. A 35 g/m$^2$ three layer "ABA" coextruded film coating is extrusion laminated onto a 1.0 oz/yd$^2$ polypropylene woven tape fabric. Each "A" layer of the coating comprises a 4.5 g/m$^2$ layer formed from a composition comprising 50% calcium carbonate, 43% polypropylene, 4% low density polyethylene, 1% calcium oxide masterbatch, 1% antioxidant and 1% UV stabilizer. The core "B" layer of the coating is a 26 g/m$^2$ layer and comprises 52% calcium carbonate, 23% linear low density polyethylene, 22% high density polyethylene, 1% calcium oxide masterbatch, 1% antioxidant and 1% UV stabilizer. The coated woven tape fabric is physically manipulated immediately by passing it over a series of metal idler rolls at 200 fpm. The WVTR of the coated substrate was found to be 93 g/m²·24 hr, as measured by ASTM E-96A.

EXAMPLE 2

This example demonstrates a breathable substrate according to the invention which comprises a single layer microporous coating. A 20 g/m² film coating is extrusion laminated to a 34 g/m² PE/PET bico spunbond nonwoven fabric. The coating comprises a composition comprising 50% calcium carbonate, 43% linear low-density polyethylene, 4% low density polyethylene, 1% calcium oxide masterbatch, 1% antioxidant and 1% UV stabilizer. The coated nonwoven fabric is physically manipulated immediately by passing it over a series of idler rolls at 200 fpm. The WVTR of the substrate was found to be 189 g/m²·24 hr, as measured by ASTM E-96A.

EXAMPLE 3

This example demonstrates a breathable substrate according to the invention, which comprises a multilayer microporous coating on a composite fabric. A 41 g/m² three layer "ABA" coextruded film coating is extrusion laminated onto a 45 g/m² composite fabric. Each "A" layer of the coating comprises a 4.5 g/m² layer formed from a composition comprising 50% calcium carbonate, 43% polypropylene, 4% low density polyethylene, 1% calcium oxide masterbatch, 1% antioxidant and 1% UV stabilizer. The core "B" layer of the coating is a 26 g/m² layer and comprises 52% calcium carbonate, 23% linear low density polyethylene, 22% high density polyethylene, 1% calcium oxide masterbatch, 1% antioxidant and 1% UV stabilizer. The 45 g/m² composite fabric of the laminate comprises a 26 g/m² spunbond polypropylene nonwoven adhesively laminated to an 18 g/m² PET scrim with 1 g/m² adhesive. The coated fabric is physically manipulated immediately by passing it over a series of metal idler rolls at 200 fpm. The WVTR of the coated substrate was found to be 72 g/m²·24 hr, as measured by ASTM E-96A.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A method of forming a breathable material comprising a laminate of a fabric layer and a polymer film layer thereon, comprising:
   a. forming a polymer film layer comprising a polymer composition and a filler, the filler present in an amount of 25% to 75% by weight of the polymer film layer;
   b. bonding the polymer film layer to a fabric layer, which comprises a woven tape fabric, to form a laminate; and
   c. applying a physical manipulation to the laminate without subjecting the laminate to incremental stretching equipment to render the polymer film layer microporous such that the WVTR of the resulting breathable material is greater than about 50 g/m²·24 hr.
   wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

2. The method according to claim 1, wherein the fabric layer comprises material selected from the group consisting of cotton, linen, wool, flax, silk, hemp, and combinations thereof.

3. The method according to claim 1, wherein the fabric layer comprises material selected from the group consisting of polyolefins, polyamides, polyesters, polyacrylates, rayon, and combinations thereof.

4. The method according to claim 1, wherein the fabric layer comprises material selected from the group consisting of polyethylene, polypropylene and combinations thereof.

5. The method according to claim 1, wherein the fabric layer has a basis weight from about 0.3 to about 4 oz/yd².

6. The method according to claim 1, wherein the polymer film layer comprises a polymer composition selected from the group consisting of polyolefins, polyesters, polyamides, thermoplastic polyurethanes, polyvinyl chloride, polystyrene, copolymers thereof, and combinations thereof.

7. The method according to claim 1, wherein the polymer film layer comprises a polymer composition selected from the group consisting of polyethylene, polypropylene and combinations thereof.

8. The method according to claim 1, wherein the filler is selected from the group consisting of calcium carbonate, barium sulfate, diatomaceous earth, talc, titanium oxide, and mixtures thereof.

9. The method according to claim 1, wherein said physical manipulation is selected from the group comprising winding, bending, twisting, pulling, biasing, compressing, heating, folding, and combinations thereof.

10. The method according to claim 1, wherein said bonding of the film layer to the fabric layer comprises extrusion coating, adhesive bonding, thermal bonding, ultrasonic bonding, sewing, or a combination thereof.

11. The method according to claim 1, further comprising the step of bonding the polymer film layer to a second fabric layer, wherein the polymer film layer is arranged between the first fabric layer and the second fabric layer.

12. A method of forming a breathable material comprising a laminate comprising a woven tape material and a microporous polymer film layer thereon, comprising:
   a. forming a microporous polymer film layer comprising a polymer composition and a filler, the filler present in an amount of 25% to 75% by weight of the polymer film layer;
   b. bonding the polymer film layer to a woven tape material layer with a basis weight between about 0.3 and 4 oz/yd² to form a laminate; and
   c. applying a physical manipulation to the laminate without subjecting the laminate to incremental stretching equipment to render the polymer film layer microporous such that the WVTR of the resulting breathable material is greater than about 50 g/m²·24 hr;
   wherein the breathable material has a first length dimension and a first width dimension before said physical manipulation and a second length dimension and a second width dimension after said physical manipulation, wherein the second length dimension is no more than about 2% greater than the first length dimension and the second width dimension is no more than about 2% greater than the first width dimension.

13. The method according to claim 12, wherein the woven tape material layer is selected from the group consisting of cotton, linen, wool, silk, hemp, polyolefins, polyamides, polyesters, polyacrylates, rayon, and combinations thereof.

14. The method according to claim 12, wherein the woven tape material comprises material selected from the group consisting of polyethylene, polypropylene, and combinations thereof.

15. The method according to claim 12, wherein the woven tape material has a basis weight from about 1.0 to about 2.5 oz/yd$^2$.

16. The method according to claim 12, wherein the woven tape material has a basis weight from about 1.5 to about 2.0 oz/yd$^2$.

17. The method according to claim 12, wherein the polymer film layer comprises a polymer composition selected from the group consisting of polyethylene, polypropylene, and combinations thereof.

18. The method according to claim 12, wherein the filler is selected from the group consisting of calcium carbonate, barium sulfate, diatomaceous earth, talc, titanium oxide, and mixtures thereof.

19. The method according to claim 12, wherein said physical manipulation is selected from the group comprising winding, bending, twisting, pulling, biasing, compressing, heating, folding, and combinations thereof.

20. The method according to claim 12, wherein said bonding of the film layer to the woven tape material layer comprises extrusion coating, adhesive bonding, thermal bonding, ultrasonic bonding, sewing, or a combination thereof.

21. The method according to claim 12, further comprising the step of bonding the polymer film layer to a fabric layer, wherein the polymer film layer is arranged between the woven tape material layer and the fabric layer.

* * * * *